No. 12,451. REISSUED FEB. 13, 1906.

W. H. HIPPISLEY, DEC'D.

R. C. HAVEN, ASSIGNEE.

GARMENT HOOK.

APPLICATION FILED JULY 21, 1905.

Inventor:
William H. Hippisley Dec'd
Rutherford C. Haven, Assigne

Witnesses:
C. C. Fuss.
C. L. Russell.

By his Attorney,
F. H. Richards.

UNITED STATES PATENT OFFICE.

RUTHERFORD C. HAVEN, OF TRENTON, NEW JERSEY, ASSIGNEE OF WILLIAM H. HIPPISLEY, DECEASED.

GARMENT-HOOK.

No. 12,451. Specification of Reissued Letters Patent. Reissued Feb. 13, 1906.

Original No. 774,426, dated November 8, 1904. Application for reissue filed July 21, 1905. Serial No. 270,734.

*To all whom it may concern:*

Be it known that WILLIAM H. HIPPISLEY, deceased, a former subject of the King of Great Britain, lately residing at Boston, in the county of Suffolk and State of Massachusetts, did invent certain new and useful Improvements in Garment-Hooks; and the following is a description of said invention, which will enable others skilled in the art to which it appertains to make and use the same.

This invention relates to garment-hooks, such as are adapted in operation to coact with an eye and form a hook-and-eye fastening.

The object of the invention is to provide a hook of this character which shall be of such construction as to permit it to be securely attached to the garment without liability of pulling loose.

With this and further objects in view the invention consists in certain features of construction and combination of parts, which are hereinafter set forth.

Figure 1:
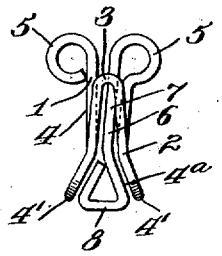
Figure 2:
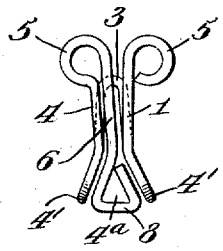

In the accompanying drawings, Figure 1 is a front elevation of a form of hook embodying the present improvements. Fig. 2 is a rear elevation thereof, and Fig. 3 is an edge view of the same.

Referring to the drawings, the base or body portion of the hook 1 carries a bill 2, and what might be termed the "free" end of the bill is designated by the reference character 3. The various parts of the hook are formed of a single piece of wire bent into the required shape. The base or body 1 comprises arms 4, and continuations of the wire forming which arms are at one end of the hook bent to form attaching-eyes 5. At the opposite end the arms are bent laterally, as at 4′, in opposite directions, forming a flaring receiving-space $4^a$. The portions 4′ carry the bill 2. The wire after forming one of the eyes 5 is continued into a tongue 6, which lies between and is normally flush with the arms 4 and is shown provided with a portion forming a hump 7, projecting toward the bill 2 of the hook. The free end of the tongue is formed with an attaching-eye 8, in the present illustration substantially triangular, which lies in the space $4^a$ between the spread-apart ends 4′ of the arms 4 and the sides of the bill 2. This eye is at the opposite end of the hook from the eyes 5 and forms means for attaching that end of the hook to a garment.

In attaching the hook to a garment the eyes 5 are sewed to the garment in the usual manner, as is also the eye 8. Thus the hook will be securely attached at practically both ends, as the eye 8 may be considered one end while the eyes 5 are at the other end of the complete hook. When a hook thus constructed is engaged with a suitable hook-eye gaping of the garment fastened by such a hook will be prevented, as will also the liability of the hook being pried loose, which is often the case when it is secured at but one end.

Figure 3:
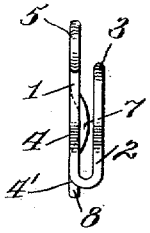

By referring to Fig. 3 of the drawings, it will be noticed that the back of the hook is perfectly flat, thus enabling it to be neatly attached to the garment. Also by reference to the drawings it will be observed that as the loop 8 lies substantially within the plane of the ends 4′ of the arms 4 it will permit the hook to be set much closer to the edge of the garment than if it projected beyond said arms, and, further, that the eye and diverged ends of the arms when constructed and arranged as set forth mutually coöperate to prevent independent play, thus not only increasing the bearing-surface at that end of the hook, but making the hook stiffer or more rigid, so that the play of the folds of the garment cannot possibly twist the same and throw strain on the stitches passing through the loop 8. Another important advantage of the said construction and arrangement is that when the eye is coupled to the hook the cross-bar of the eye may bear upon the body of the loop 8 and further increase the rigidity and lessen any tendency to independent movement of the elements of the hook.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described the invention, what is claimed as new, and desired to be secured by Letters Patent, is—

1. A hook of the character described, comprising side arms, each carrying at one end an eye and spread apart or diverged at their opposite ends to form a receiving-space and terminating in a bill lying parallel with said side arms, and a tongue lying between said arms and having a hump intermediate its ends projecting toward said bill and formed with an angular attaching-eye which lies in said receiving-space between and approximately within the plane of said divergent or spread-apart ends of the arms, substantially as described.

2. A hook of the character described, comprising side arms, each carrying at one end an eye, and spread apart or diverged at their opposite ends, forming a receiving-space and terminating in a bill lying parallel with said side arms, and a tongue lying between said arms and formed with an attaching-eye, which lies in said receiving-space between and approximately within the plane of said divergent or spread-apart ends of the arms.

3. A hook of the character described, formed from a single piece of wire and comprising side arms, the wire from each of the arms formed at one end with an eye, said arms being spread apart or diverged at their opposite ends, forming a receiving-space and terminating in a bill, and said wire extending from the portion forming one of said eyes into a tongue lying between said arms, said tongue ending in an attaching-eye which lies in said receiving-space between and approximately within the plane of said divergent or spread-apart ends of the arms.

4. A garment-hook having means of attachment at one end, arms bent upon themselves for forming a bill, the bend being at the other end of the hook and the arms at and adjacent to the bend being bent laterally and spread apart forming a space, and means of attachment in the said space.

5. A garment-hook having an eye at one end, arms bent upon themselves for forming a bill, the bend being at the other end of the hook, and the arms at and adjacent to the bend being laterally divergent and spread apart forming a space, and an eye in the said space.

6. A garment-hook having eyes at one end, side arms laterally spread apart or diverged at the other end of the hook forming a receiving-space, said arms terminating in a bill, and a tongue lying between said arms and formed with an attaching-eye normally lying in said receiving-space between and approximately within the plane of said divergent or spread-apart ends of the arms.

Signed at Trenton, in the county of Mercer and State of New Jersey, this 19th day of July, 1905.

RUTHERFORD C. HAVEN,
*Assignee of the entire interest of William H. Hippisley, deceased.*

Witnesses:
MARGE T. SIMPSON,
GEO. W. MACPHERSON.